F. J. BETZ.
SELF WINDING WEIGHT MOTOR.
APPLICATION FILED AUG. 6, 1914.

1,181,062.

Patented Apr. 25, 1916.

Witnesses:
E. J. Jacker
M. Jacker

Inventor:
Fred J. Betz
By Richd J. Jacker
Atty.

UNITED STATES PATENT OFFICE.

FRED J. BETZ, OF SALINA, COLORADO.

SELF-WINDING WEIGHT-MOTOR.

1,181,062.  Specification of Letters Patent.  Patented Apr. 25, 1916.

Application filed August 6, 1914. Serial No. 855,511.

*To all whom it may concern:*

Be it known that I, FRED J. BETZ, a citizen of the United States, residing at Salina, in the county of Chaffee and State of Colorado, have invented a new and useful Self-Winding Weight-Motor, of which the following is a specification.

My invention relates to motors in which the driving power is derived from a weight descending by force of gravity and the objects of my improvements are, first, to eliminate the necessity of winding up the cord, chain or the like on which the weight hangs; second, to make a simple, compact, cheap and durable device; third, to make a motor especially adapted to run a clock works and other features to become apparent from the description to follow.

Heretofore as far as I am aware weight motors have been constructed in which a cord, chain or the like was provided on which the weight hung and said cord, chain or the like had to be wound up every time the weight descended to the limit of its downward movement. Various means have been employed to wind up the cord, chain or the like, such as a removable key, a removable crank handle and a pull chain as is used on coo coo clocks. All of these winding devices require a certain amount of physical energy to operate and all are accompanied by more or less noise, which is objectionable.

By the use of my invention no physical energy is required to wind up the cord, chain or the like and no noise of any kind is caused by the operation of the device which consists of two winding drums or reels for the cord and two separate cords, one for each drum or reel. The drums or reels are connected by suitable gearing so that the one always turns in the opposite direction to the other, and the cords are so arranged that when the one drum or reel is rotated by the descending weight on its cord the other drum or reel is rotated to wind up its cord to which no weight is attached. When the weight reaches the limit of its downward movement it is transferred to the other cord and is then in a position to descend again and rotate the other drum or reel.

To describe my invention so that others versed in the art to which it pertains can make and use the same I have illustrated it on the accompanying sheet of drawing forming a part of this specification and in which—

Figure 1:
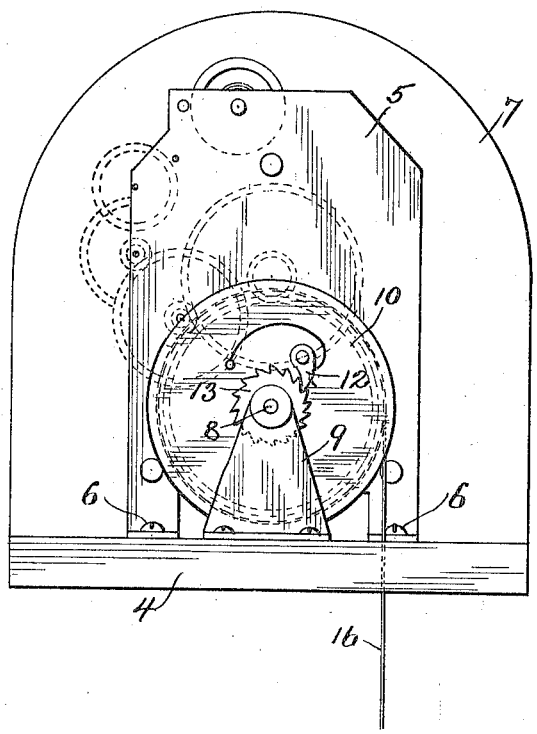
Figure 2:
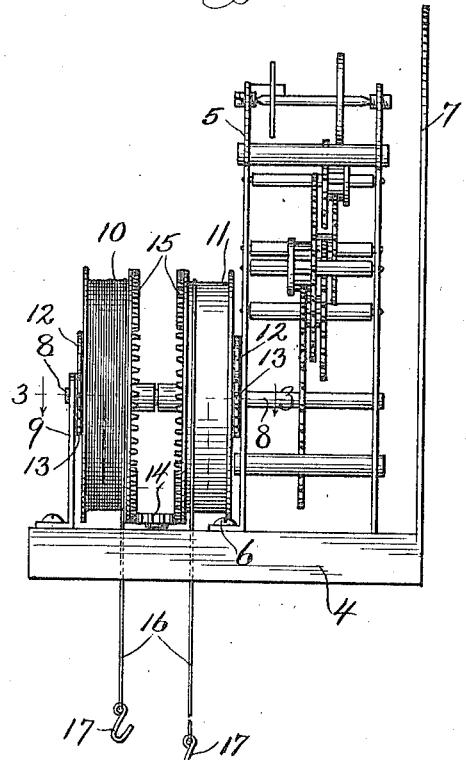
Figure 3:
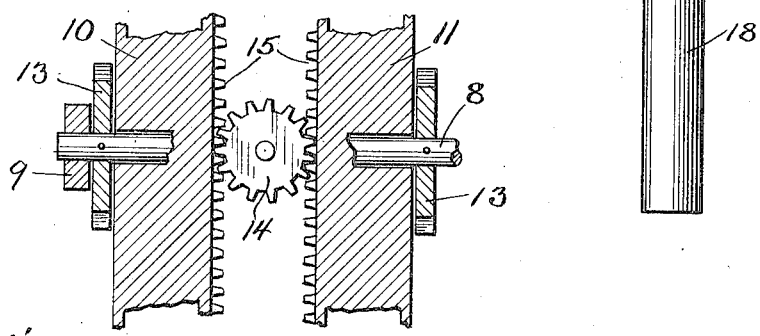

Figure 1, is an end elevation of a weight motor embodying my invention shown applied to a clock work; Fig. 2, is a side elevation of the same and Fig. 3, is a plan section taken on line 3—3 of Fig. 2, partly broken away and enlarged for the purpose of better illustrating the same.

Similar reference characters refer to similar parts throughout the several views.

Upon a suitable base 4, is secured a clock work 5 by means of any suitable fastening as the screws 6. The clock dial is shown at 7 and the main drive shaft at 8 which is extended a material distance away from the clock work and has its extremity mounted in a suitable bearing 9 which is also secured to the base 4.

Loosely mounted on the drive shaft 8 between the clock work 5 and bearing 9 are the two winding drums or reels 10 and 11, which are each provided with a pivoted spring pressed pawl 12 which operatively engage the ratchet wheels 13 rigidly secured on the shaft 8. The ratchet wheels 13 and pawls 12 are so arranged that the shaft 8 will be rotated clockwise as viewed in Fig. 1, when either of the drums or reels 10 and 11 rotate clockwise, and the said drums or reels 10 and 11 are at all times free to rotate contraclockwise without disturbing the shaft 8.

The drums or reels 10 and 11 are geared together so that the one will rotate oppositely to the other, and I conveniently accomplish such movement by mounting a small gear wheel 14 loosely on a shaft arranged at right angles to shaft 8 and midway between said drums or reels 10 and 11. The opposing sides of the drums or reels 10 and 11 are provided with gears 15 which are in constant mesh with the small gear 14 as clearly shown in Fig. 3.

A suitable cord or chain 16 is attached at one end to each drum or reel 10 and 11 so as to have its free end depending from the same and extending downward through suitable holes provided in the base 4. The lower free end of each cord 16 is provided with a hook 17 for the purpose of attaching and detaching a suitable weight 18. When the weight 18 is attached to one cord 16, the drum to which said cord leads will be rotated in a direction to rotate shaft 8, and through the gear 14 the other drum will be rotated in the opposite direction to wind up the cord 16 on said last named drum. Thus it is clear while the weight descends and unwinds the cord 16 from one drum it also winds the cord up on the other drum.

Only one weight 18 is employed and it is always attached to one or the other of the cords 16, but no matter to which of said cords the weight 18 is attached it always tends to rotate shaft 8 clockwise as viewed in Fig. 1, by means of the pawls 12 and ratchet wheels 13.

While I have shown and described my invention in connection with a clock work it is applicable to other machines and devices and it will be understood that numerous changes in the arrangement and construction of the several parts can be made without in the least departing from the scope of my invention.

Having thus fully described my invention what I claim as new and desire to secure by Letters Patent of the United States is:—

1. In a device of the class described, a drive shaft, a winding drum having a weight cord attached thereto mounted loosely on said shaft, a second winding drum having a weight cord attached thereto mounted loosely on said shaft, means operatively connecting said two winding drums, whereby one will rotate in the reverse direction of the other and means operatively connecting said shaft and said two winding drums whereby the shaft will always be rotated in the same direction by the rotation of said winding drums.

2. In a device of the class described, a driving shaft, a winding drum having a weight cord attached thereto loosely mounted on said shaft, a second winding drum having a weight cord attached thereto loosely mounted on said shaft adjacent the first named winding drum, a circular row of teeth on the opposing sides of said two winding drums, a small gear suitably mounted midway between said two winding drums in constant mesh with the said circular row of teeth on the drums and a pawl and ratchet wheel forming operative connection between each of said winding drums and said shaft.

3. In a device of the class described, a drive shaft, a winding drum having a weight cord attached thereto, a second winding drum having a weight cord attached thereto, means operatively connecting said two winding drums whereby one will rotate in the reverse direction of the other and means operatively connecting said shaft and said two winding drums whereby the shaft will always be rotated in the same direction by the rotations of said winding drums.

4. In a device of the class described, a drive shaft, a winding drum having a weight cord attached thereto, a second winding drum having a weight cord attached thereto, means operatively connecting said two winding drums, whereby the weight cord on the one drum will be winding up while the weight cord on the other drum is unwinding and means operatively connecting said shaft and said two winding drums whereby the shaft will always be rotated in the same direction by the rotation of said winding drums.

In testimony whereof I have signed my name to this specification in presence of two subscribing witnesses, this 24th day of June, 1914, at Chicago, Illinois.

FRED J. BETZ.

Witnesses:
R. J. JACKER,
MORRIS LEWIS.

Copies of this patent may be obtained for five cents each, by addressing the "Commissioner of Patents, Washington, D. C."